United States Patent [19]

Barnaby

[11] 4,267,005
[45] May 12, 1981

[54] HEAT SEALING APPARATUS

[76] Inventor: Roland E. Barnaby, Leggett Rd. R.D. 1, High Falls, N.Y. 12440

[21] Appl. No.: 34,748

[22] Filed: Apr. 30, 1979

[51] Int. Cl.³ .......................................... B29C 27/02
[52] U.S. Cl. ................................... 156/380; 156/251; 156/272; 156/498; 156/499; 156/515
[58] Field of Search ............... 156/251, 272, 380, 498, 156/499, 515

[56] References Cited

U.S. PATENT DOCUMENTS

| | | | |
|---|---|---|---|
| 3,262,833 | 7/1966 | Zelnick | 156/583 |
| 3,347,729 | 10/1967 | Seefluth | 156/380 |
| 3,672,116 | 6/1972 | Ingmarson | 156/498 |
| 3,846,210 | 11/1974 | Groundwater | 156/498 |

OTHER PUBLICATIONS

"Innovations", Package Engineer, Barnaby, p. 45, Apr. 1978.

*Primary Examiner*—Caleb Weston
*Attorney, Agent, or Firm*—Eisenman, Allsopp & Strack

[57] ABSTRACT

There is disclosed a radiant energy device for bonding thermoplastic films without contact between the plastic films and the radiant energy sources in the form of resistance wires heated to incandescence by pulses of current timed to occur when the plastic films have been supported in tension and the wires have been brought to a point of close proximity to but spaced from the films. The wires are received in contoured reflecting cavities to focus and control the radiant energy, and the cavities are ducted to a source of coolant fluid which is applied in pulses timed in relation to the current pulses to cool and solidify the plastic seals and to cool the system to a reference temperature level at the conclusion of each cycle so that uniform sealing standards can be maintained. Resiliently biased, movable end supports for the wires maintain uniform tension under changes of wire length with temperature so that the distance of the wires from the films is uniform and unchanging at all points along its length.

8 Claims, 8 Drawing Figures

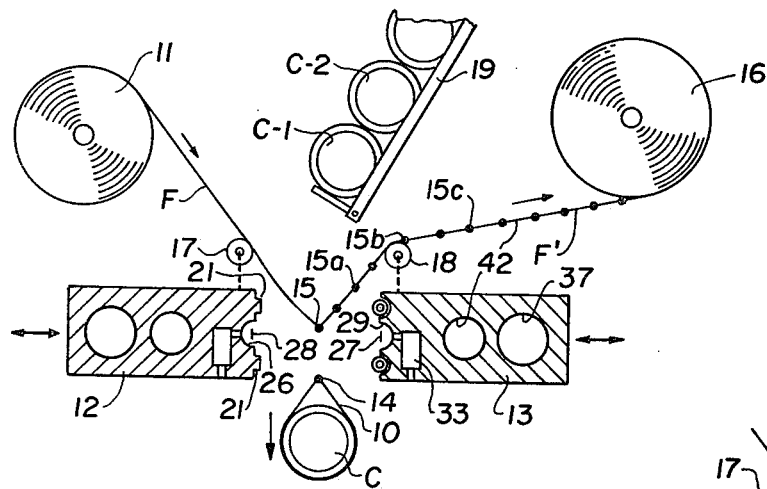
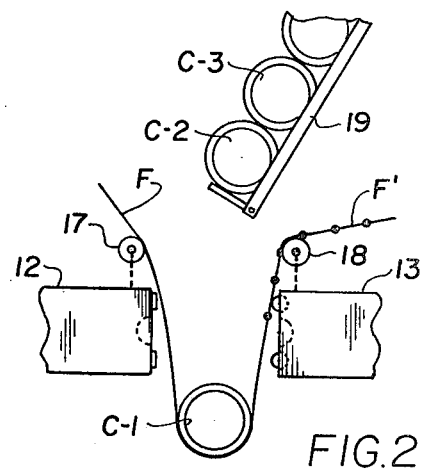
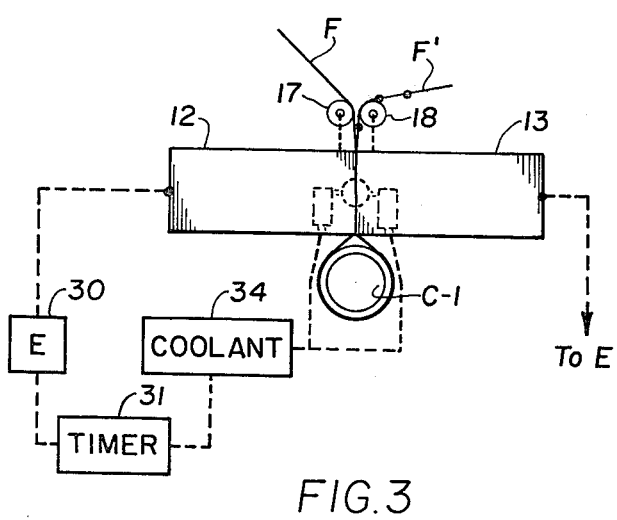
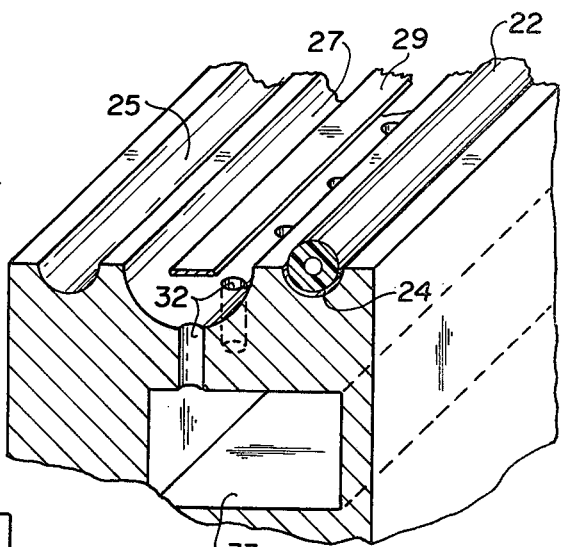
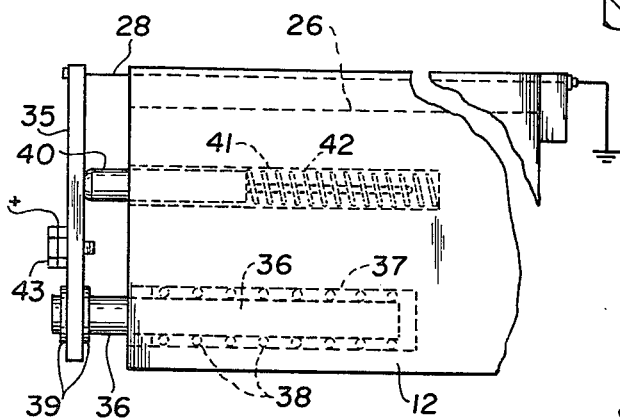

HEAT SEALING APPARATUS

BACKGROUND OF THE INVENTION

Thermoplastic films are conventionally bonded by heat applied in a number of ways including hot knives and hot wires pressed into or passed through the films, ultrasonically vibrated heads pressed against the films and, more recently, radiant energy from resistance wires heated to incandescence by electrical energy. Hot knives and wires which touch the films have a tendency to cause burning of the plastic which emits noxious fumes and can cause undesirable puckering of the weld. Ultrasonic devices tend to be expensive, the quality of the seal is subject to variations, and the speed of operation can be slow. Radiant energy devices have the advantage of low energy consumption and, under the best conditions, improved seals and cuts because of the absence of physical contact with the plastic films. Heretofore, such devices have been subject to control problems in which the plastic films can be either overheated or underheated, causing imperfect seals as well as problems of uniform heating along the length of a seal due to changes in the lengths of the heated wires between their hot and cold modes. Accordingly, the present invention has for its objects to provide new and improved means for effecting the melting and sealing of thermoplastic films by radiant energy applied from a source which at no time contacts the films.

THE PREFERRED EMBODIMENT

Thermoplastic film sealing and severing are achieved by controlled and focused radiant energy pulses, preferably generated on both sides of the plastic films by electrical resistance wires heated to incandescence, to melt the films at temperatures below the charring and burning points without any mechanical contact between the films and the radiant heat generators. The softened and melted films, initially held under light tension across the sealing line, part along the line of maximum radiation intensity and fuse together in a permanent and imperforate bond on each side of the parting line.

The sealing heads which carry the wire are movable toward and away from the sealing plane of the plastic film. Each head is formed along its length with an enlarged longitudinal cavity, preferably contoured in cross-section, and in which is disposed the radiant energy source in the form of an electrical resistance heating wire or tape, with its major surfaces parallel to the plane of the film. The wire is centered in the cavity at a point close to the open edge so that radiant energy from the surface facing the film has a path of travel which is substantially shorter than the path to the inner walls of the cavity which serve to diffuse the non-directed radiant energy to subordinate it to the direct path. The geometry of the wire and its proximity to the sealing plane determine the amount of energy imparted to the plastic film and the width of the area over which fusing occurs.

The precision and uniform spacing of the wire from the film is critical and, to this end, the wire is so supported in accordance with the invention that it remains substantially the same distance from the film along the entire length of the seal. Tension is applied to the wires through a resilient support which is carried in the head in a linear bearing so that, as the wire undergoes substantial change in its length between its heated and unheated modes, the end points of support at no time have a component of motion toward or away from the plane of the film while maintaining constant tension. Thus, sagging of the wire in its heated condition is obviated to eliminate possible contact with the plastic and to effect an absolutely uniform seal at all points along its length.

The duration of the electrical pulses is controlled to accommodate plastic films of different thicknesses and different melting characteristics. Further precision in the control of the amount of radiant energy is obtained by providing for rapid cooling of the wires and nearby parts at the end of the pulse cycle. Fluid cooling using compressed air, for example, is effected by means of a longitudinal array of ducts in each cavity, with the holes being connected to a common manifold connected to a source of cooling air which is preferably pulsed in timed relation with respect to the electrical pulses. The speed of cycling is increased in accordance with the invention by utilizing the coolant fluid to set the thermoplastic quickly after softening to enable the bonded plastic films to be more quickly released from the apparatus.

The sealing heads are adapted to grip the plastic films on either side of the radiant energy cavities and to impart controlled transverse tension thereto when the heads are brought together. To this end, one head is formed with a pair of offset compression pads extending longitudinally along either side of the cavity, and the mating head is formed with a pair of similarly arranged longitudinal channels in which are seated resilient fillers, such as tubes, which are adapted to be engaged by the pads to depress the film out of its normal plane along the lines of contact and to hold the film in a fixed plane between the radiant energy cavities under light tension.

BRIEF DESCRIPTION OF THE DRAWINGS

FIG. 1 is a view in end elevation and partly in cross-section and diagrammatic in nature, of a plastic film severing and sealing apparatus formed in accordance with the present invention and which draws thermoplastic shrink film from a supply which is formed in cylindrical over-sized sleeves around products prior to shrinking the film to form a snug plastic covering;

FIG. 2 is a view in end elevation and partly in cross-section, showing a product in position to be enveloped by a plastic film and with the severing and sealing heads of the apparatus open;

FIG. 3 is a fragmentary view corresponding to FIG. 2, showing the severing and sealing heads closed;

FIG. 4 is a view in cross-section and perspective, showing one severing and sealing head;

FIG. 5 is a fragmentary view in side elevation showing the end support for the electrical resistance wire which is the source of radiant energy; and FIGS. 6A, 6B and 6C are views in cross-section in enlarged scale of three shapes of resistance wire which can be used in accordance with the invention.

THE PREFERRED EMBODIMENT

Referring to FIGS. 1–3, the invention is illustrated as embodied in an apparatus for forming loose sleeves 10 of shrinkable thermoplastic film F from a reel source 11 around a sequence of product containers C such, for example, as jars of a product. After emerging from the apparatus enveloped in the loose sleeves 10, the containers are conveyed to a shrink oven in which the sleeves 10 are tightly drawn about the containers, which apparatus forms no part of the present invention.

The apparatus includes a pair of relatively movable heads 12 and 13, shown parted in FIG. 1. The two heads are adapted to move toward and away from each other, and either both or one of the heads can be movable. As shown in FIG. 1, one container C has been enveloped in its sleeve 10, which includes a seal 14 formed by the apparatus. The web of thermoplastic film F, from which the sleeve 10 was formed, includes a second seal 15 which joins the web from the source 11 to a waste web of plastic film F', leading to a take-up reel 16 and formed of a continuous sequence of seals 15a, 15b, 15c . . . 15m, each joined by a short length of plastic film. The webs of film F and F' pass over guide rollers 17 and 18 which are spaced apart to form a web pocket into which the next container C' is dropped from a feed apparatus 19.

As seen in FIG. 2, the container C-1 has been dropped into the web pocket and has pulled a length of the web F from the supply reel 11, while the take-up reel 16 has been indexed forwardly for a distance corresponding to the distance between two of the seal lines 15a, 15b. At this time, the two heads 12 and 13 are brought into mating relationship, as shown in FIG. 3, to grip the two proximate film layers tightly together and anchor them in position to be severed and sealed.

In accordance with the invention, the films are gripped close to the severing line by a pair of parallel offset ribs 20 and 21 carried by the head 12 and adapted to engage a pair of resilient pads 22 and 23 seated in recesses 24 and 25 respectively formed in the head 13. As best seen in FIG. 3, when the two heads are mated, the overlapping films are brought into close contact and held under tension across the line of severing and sealing. The heads 12 and 13 are formed with opposed cavities 26 and 27 respectively embracing the line of severing and sealing. Tautly suspended within the cavities 26 and 27 are electrical resistance wires 28 and 29, spaced from the walls of the cavities and recessed a slight distance such, for example, as 0.01 inch, into the cavities so that they will remain at all times spaced from the plane of the films during the severing and sealing operation. The resistance wires 28 and 29 are connected, as shown schematically in FIG. 3, to a current source 30 adapted to emit current pulses under the control of a timer 31, it being understood that the source 30 is connected to one end of each wire and that the other end is grounded (not shown).

When the wires are pulsed, they immediately heat to incandescence and radiate energy to the plastic films, with the energy being concentrated intensively along a severing and sealing line centered between the clamping points. The plastic films become liquid and shrink away from the parting line in both directions with a bead of molten plastic forming along each severed edge, one bead corresponding to the seal 14 and the other to the seal 15, as shown in FIG. 1. Meantime, the current has been turned off in the resistance wires and the beads begin to solidify forming uniform seals as they approach the sides of the mated cavities 26 and 27. Normally, the heads would be required to be maintained in clamping position for an extended period of time until the seals had formed and solidified within the confines of the mated cavities. In accordance with the invention, however, coolant fluid is pulsed into the cavities after the beads have formed through a longitudinal array of ducts 32 connected to a manifold 33 (as best seen in FIG. 4) connected, as shown diagrammatically in FIG. 3, to a source of coolant fluid, such as compressed air 34, controlled by the timer 31.

The pulse of coolant air, which can be vented through the ends of the ducts 26 and 27 or, alternatively, through a longitudinal array of exhaust ducts (not shown), are timed and directed so that they quickly cool the electrical resistance wires and also the solidifying beads of plastic forming the seal lines. Premature or misdirected blasts of coolant fluid can destroy the unhardened seals so that the timing of the pulses must be related to the nature of the plastic films being accommodated. The coolant fluid also serves to bring the entire system down toward a base or reference temperature, to avoid heat buildup in the sealing heads and to prepare the system for the next sealing operation under uniform operating conditions.

The cavities 26 and 27 are contoured to reflect radiant energy to the plastic films to accelerate the softening and also to accelerate the heating of the resistance wires themselves. The contouring can be made to focus the radiant energy either more sharply along the parting line or to diffuse it over a larger area of the plastic film to assist in the formation of the sealing bead. Also, as best seen in FIG. 6, the resistance wires can themselves be formed in a variety of shapes to bring about differing effects at the sealing area. A circular cross-section, as shown in FIG. 6A, will radiate uniformly in all directions with the highest heating effect occurring along a thin line in the plastic film. The tape or rectangular cross-section of the configuration of FIG. 6B will result in a band of intensive radiant energy which will change the melting characteristics of the thermoplastic, and the curving configuration of FIG. 6C will magnify the radiant energy when the concave surface faces the plastic and diffuse it when the convex surface faces the plastic.

Referring to FIG. 5, there is shown a mechanism for maintaining the resistance wire under uniform tension throughout the effects of rapid expansion and contraction of the wire in its hot and cold modes. To this end, one end of the wire 28 is anchored in a movable carrier 35 supported by a slide bar 36 in an elongated recess 37 formed in the head 12 and constrained therein by a linear ball-bearing assembly 38 for movement parallel to the axis of the resistance wire. The movable support 35 is joined to the slide bar 36 across insulators 39 and is urged outwardly by a push rod 40 to maintain the wire 28 in tension. The push rod 40 is received in the end of the head and is urged outwardly by a compression spring 42. The assembly is completed by an electrical terminal 43 adapted to be connected through a flexible lead to the current source 30.

While the invention has been described above having reference to a particular packaging apparatus, it will be understood that it can take other forms and arrangements such, for example, as L sealers. Also, for certain applications, radiant energy can be applied on one surface rather than both surfaces of the plastic film and, depending on the radiant energy intensity and the nature of the thermoplastic film, the apparatus can be used for sealing films as well as severing and sealing, sometimes called "trim sealing." The invention should not, therefore, be regarded as limited except as defined in the following claims.

I claim:

1. Apparatus for bonding overlapping thermoplastic films comprising complementary mating head portions adapted to be brought together across the film layers to be heat bonded, support means carried by at least one of the heads to hold the plastic films in laminated relationship and under tension transversely of the bonding line, each head having a longitudinal cavity to overlie the bonding area, an electrical resistance wire suspended in each cavity spaced from the plane of the plastic films to define a radiation gap, means to pulse the wires with electrical energy to establish radiation to melt the plastic films to effect severing through the films along a parting line and bonding of the overlapping molten films in beads on both sides of the parting line, and duct means to introduce coolant fluid into at least one of the cavities, said ducts being positioned to discharge jets of coolant fluid directly against the wire on the side opposite the plastic films, thereby to impinge directly on the wire to reduce the temperature and indirectly on the bonding film to effect hardening thereof without destroying the beads, said coolant fluid being introduced a predetermined time after the application of radiant energy and before release of the support means holding the laminated films.

2. Apparatus as set forth in claim 1, said resistance wire having a curved surface facing the films.

3. Apparatus as set forth in claim 1, including variable timing means to control the duration of the energizing pulses.

4. Apparatus as set forth in claim 1, including cooling fluid manifolds carried by each of said heads and duct means connecting the manifold to the cavity along the length of the bonding line.

5. Apparatus as set forth in claim 4, including a source of coolant fluid under pressure, and timing means to inject coolant fluid into the cavities after a predetermined delay to allow partial hardening of the molten plastic along the seal lines, thereby to accelerate the formation of integral bonds without destroying the seals.

6. Apparatus as set forth in claim 1, one of said heads including a pair of longitudinal cavities parallel to and on opposite sides of the cavity containing the resistance wire, resilient pads carried in each of said cavities, and a pair of rib elements on the other of said heads parallel to and on opposite sides of said cavity for the resistance wire and adapted to engage the plastic film and to press it downwardly against the resilient pad in the other head to stretch the plastic film taut between the radiant energy cavities.

7. Apparatus as set forth in claim 1, said resistance wires being supported at their ends and held in tension, and means to maintain uniform tension on the resistance wires comprising a movable wire support to which the resistance wires are anchored, including a longitudinal cavity formed in the end of the head and disposed parallel to the linear wire cavity, a finger formed on said support and entering the cavity, and linear ball bearing means supporting the finger in the cavity whereby the support is constrained against angular movement but free to move in the direction of the longitudinal axes of the resistance wires, and resilient means urging the support outwardly against the tension of the wires at a point between the resistance wires and the linear bearing.

8. Apparatus as set forth in claim 1, said resistance wire comprising a flat strip in which its major surface is parallel to the plane of the films.

* * * * *